(12) United States Patent (10) Patent No.: US 8,107,545 B2
Niu et al. (45) Date of Patent: Jan. 31, 2012

(54) METHOD AND SYSTEM FOR PHASE TRACKING IN WIRELESS COMMUNICATION SYSTEMS

(75) Inventors: Huaning Niu, Milpitas, CA (US);
Pengfei Xia, Mountain View, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 945 days.

(21) Appl. No.: 12/112,985

(22) Filed: Apr. 30, 2008

(65) Prior Publication Data

US 2009/0274233 A1 Nov. 5, 2009

(51) Int. Cl.
*H04K 1/10* (2006.01)
(52) U.S. Cl. ........................................... 375/260
(58) Field of Classification Search .................. 375/260
See application file for complete search history.

(56) References Cited

U.S. PATENT DOCUMENTS

| | | | | |
|---|---|---|---|---|
| 5,282,227 A * | 1/1994 | Crawford | | 375/327 |
| 6,690,747 B2 * | 2/2004 | Petrus et al. | | 375/324 |
| 7,139,340 B2 * | 11/2006 | Scarpa | | 375/344 |
| 7,352,688 B1 * | 4/2008 | Perahia et al. | | 370/206 |
| 7,366,250 B2 * | 4/2008 | Mujtaba et al. | | 375/267 |
| 7,415,074 B2 * | 8/2008 | Seto et al. | | 375/260 |
| 7,486,726 B2 * | 2/2009 | Alexander et al. | | 375/232 |
| 7,616,723 B2 * | 11/2009 | Wang et al. | | 375/355 |
| 7,668,262 B2 * | 2/2010 | Woo et al. | | 375/343 |
| 2002/0160737 A1 * | 10/2002 | Crawford | | 455/272 |
| 2002/0176483 A1 * | 11/2002 | Crawford | | 375/137 |
| 2004/0081131 A1 * | 4/2004 | Walton et al. | | 370/344 |
| 2005/0047384 A1 * | 3/2005 | Wax et al. | | 370/338 |
| 2005/0054313 A1 * | 3/2005 | Gummadi et al. | | 455/226.1 |
| 2005/0163081 A1 * | 7/2005 | Aoki et al. | | 370/334 |
| 2005/0276347 A1 * | 12/2005 | Mujtaba et al. | | 375/299 |
| 2007/0147226 A1 * | 6/2007 | Khandekar et al. | | 370/208 |
| 2007/0253497 A1 * | 11/2007 | Chen | | 375/260 |
| 2008/0002780 A1 * | 1/2008 | Yu et al. | | 375/267 |
| 2009/0059845 A1 * | 3/2009 | Cooper et al. | | 370/328 |
| 2009/0129258 A1 * | 5/2009 | De Courville et al. | | 370/208 |
| 2010/0290449 A1 * | 11/2010 | Van Nee et al. | | 370/338 |

OTHER PUBLICATIONS

Moose, "A Technique for Orthogonal Frequency Division Multiplexing Frequency Offset Correction," IEEE Transactions on Communications, vol. 42, No. 10, Oct. 1994.*
Sakata, "Real-time Phase Tracking Method for IEEE 802.11 a/g/n. Receiver under Phase Noise Condition, "IEEE 63rd Vehicular Technology Conference, 2006. VTC 2006-Spring, vol. 4 Publication Year: 2006, pp. 1951-1955.*
Liu, "A space-time block coding system with backward compatibility for OFDM-based WLANs," SoutheastCon, 2007. Proceedings. IEEE Issue Date: Mar. 22-25, 2007 on pp. 105-110.*

(Continued)

*Primary Examiner* — Juan A Torres
(74) *Attorney, Agent, or Firm* — Kenneth L. Sherman, Esq.; Michael Zarrabian, Esq.; Myers Andras Sherman & Zarrabian LLP

(57) ABSTRACT

A method and system phase tracking in a wireless communication system is provided. Phase tracking involves receiving a first Orthogonal Frequency Division Multiplexing (OFDM) symbol and a second OFDM symbol which is a repetition of the first symbol, over a wireless channel, the symbols representing an incoming signal. A phase of the incoming signal is extracted by performing phase tracking across all subcarrier data tones and pilot tones of the symbols.

21 Claims, 5 Drawing Sheets

OTHER PUBLICATIONS

Onizawa, "A new simple adaptive phase tracking scheme employing phase noise estimation for OFDM signals," IEEE 55th Vehicular Technology Conference, 2002, VTC Spring 2002, vol. 3, Publication Year: 2002, pp. 1252-1256 vol. 3.*

IEEE80211a, "Part 11: Wireless LAN Medium Access Control (MAC) and Physical Layer (PHY) specifications High-speed Physical Layer in the 5 GHz Band", IEEE 1999 pp. 6-24.* van Zelst, "MIMO OFDM for Wireless LANs", Ph.D. Disseration, Department of Electrical Engineering, Eindhoven University of Technology, Apr. 2004. This document can be found at http://www.avzelst.nl/dissertation_avanzelst.pdf.*

Assalini, "Outage Behavior for Transmit Diversity OFDM-Based Systems" (2007) Riunione annuale GTTI, Rome, Italy, Jun. 2007.*

Heiskala, "OFDM Wireless LANS: a theoretical and practical guide", SAMS 2001 pp. 13, 37, 54-57, 67-76, 191 and 290-296.*

Heiskala, J. et al., "OFDM Wireless LANs: A Theoretical and Practical Guide," Dec. 2001, pp. 74-75, Sams Publishing, Indianapolis, in, USA.

Speth, M. et al., "Optimum Receiver Design for Wireless Broad-Band Systems Using OFDM—Part I," IEEE Transactions on Communications, Nov. 1999, pp. 1668-1677, vol. 47, No. 11, IEEE Communications Society, New York, NY, USA.

Speth, M. et al., "Optimum Receiver Design for OFDM-Based Broadband Transmission—Part II: A Case Study," IEEE Transactions on Communications, Apr. 2001, pp. 571-578, vol. 49, No. 4, IEEE Communications Society, New York, NY, USA.

Intel Corporation et al., "WirelessHD Specification Version 1.0 Overview," Jan. 24, 2008, 77 pages, United States.

* cited by examiner

METHOD AND SYSTEM FOR PHASE TRACKING IN WIRELESS COMMUNICATION SYSTEMS

FIELD OF THE INVENTION

The present invention related to wireless communication and in particular to directional transmissions in high speed wireless systems.

BACKGROUND OF THE INVENTION

In wireless communication systems, antenna diversity plays an important role in increasing the system link robustness. Orthogonal Frequency Division Multiplexing (OFDM) is used as a modulation technique for transmitting digital data using radio frequency (RF) signals. In OFDM, a radio signal is divided into multiple sub-signals that are transmitted from a transmitter simultaneously at different frequencies to a receiver. Each sub-signal travels within its own unique frequency range (sub-channel), which is modulated by the data. OFDM distributes the data over multiple channels, spaced apart at different frequencies.

OFDM modulation is typically performed using a transform, such as a Fast Fourier Transform (FFT) process, wherein bits of data are encoded in the frequency-domain onto sub-channels. As such, in the transmitter, an Inverse FFT (IFFT) is performed on the set of frequency channels to generate a time-domain OFDM symbol for transmission over a communication channel. The IFFT process converts the frequency-domain phase and amplitude data for each sub-channel into a block of time-domain samples which are converted to an analogue modulating signal for an RF modulator. In the receiver, the OFDM signals are processed by performing an FFT process on each symbol to convert the time-domain data into frequency-domain data, and the data is then decoded by examining the phase and amplitude of the sub-channels. Therefore, at the receiver, the reverse process of the transmitter is implemented. Further, transmit antenna diversity schemes are used to improve the OFDM system reliability. Such transmit diversity schemes in OFDM systems are encoded in the frequency-domain as described.

In an OFDM link, the subcarriers are perfectly orthogonal only if the transmitter and the receiver use exactly the same frequencies. Any frequency offset immediately results in an inter-carrier interference (ICI). However, a practical receiver oscillator does not produce a carrier at exactly one frequency, but rather at a carrier that is phase modulated by random phase jitter. Though phase noise and frequency offsets only cause a degradation of signal-to-noise-ratio (SNR) in single-carrier systems, such noise and offsets cause interference in OFDM systems, which is much more severe.

As frequency is the time derivative of phase, in conventional OFDM systems, frequency offset estimation is performed using the preamble sequence at the receiver side to compensate for imperfection of the receiver oscillator. However, there remains a small amount of residual frequency offset due to estimation error. This residual frequency offset accumulates over time and causes large residual phase rotation, thereby severely degrading the receiver performance. As such, the main problem of the residual frequency offset is constellation rotation. This effect forces the receiver to track the carrier phase while data symbols are received.

Conventional phase tracking is used to track the phase rotation over time in order to compensate it at the receiver side (e.g., data-aided carrier phase tracking). Certain systems include 4 predefined subcarriers among the transmitted data. These special subcarriers are referred to as pilot subcarriers. The main purpose of these pilots is to help the receiver track the carrier phase. After a Discrete Fourier Transform (DFT) of the nth received symbol, the pilot subcarriers $R_{n,k}$ are equal to the product of the channel frequency response $H_k$ and the known pilot symbols $P_{n,k}$, rotated by the residual frequency error, as:

$$R_{n,k}=H_k P_{n,k} e^{j2\pi n f_\Delta}$$

wherein n is the time index, k is the frequency index, $f_\Delta$ is the fractional frequency error response normalized for sub-carrier spacing.

Assuming an estimate of $\hat{H}_k$ of the channel frequency response is available, the phase estimate $\hat{\Phi}_n$ can be expressed as:

$$\hat{\Phi}_n = \angle \left[ \sum_{k=1}^{N_p} R_{n,k} (\hat{H}_k P_{n,k})^* \right],$$

$$= \angle \left[ \sum_{k=1}^{N_p} H_k P_{n,k} e^{j2\pi n f_\Delta} (\hat{H}_k P_{n,k})^* \right]$$

wherein Np is the number of pilots and $\angle$ represents the angle of a complex number.

Assuming that the channel estimate is perfectly accurate, the phase estimate $\hat{\Phi}_n$ can then be expressed as:

$$\hat{\Phi}_n = \angle \left[ \sum_{k=1}^{N_p} |H_k|^2 |P_{n,k}|^2 e^{j2\pi n f_\Delta} \right].$$

$$= \angle \left[ e^{j2\pi n f_\Delta} \sum_{k=1}^{N_p} |H_k|^2 \right]$$

In practice, however, channel estimates are not perfectly accurate, thus contributing to the noise in the phase estimate.

As the channel estimation error contributes to the phase estimation for tracking, and degrades the performance, an improved phase tracking algorithm relies on the continuous pilot tone where the pilot position is fixed from one OFDM symbol to the other OFDM symbol. In this case, pilot subcarriers $R_{n,k}$ can be expressed as:

$$R_{n,k}=H_k P_{n,k} e^{j2\pi n f_\Delta}$$

$$R_{n-1,k}=H_k P_{n-1,k} e^{j2\pi (n-1) f_\Delta}.$$

Since $P_{n,k}=P_{n-1,k}$, the phase estimate $\hat{\Phi}_n$ can be expressed as:

$$\hat{\Phi}_n = \angle \left[ \sum_{k=1}^{N_p} R_{n,k} R_{n-1,k}^* \right] \quad (1)$$

$$= \angle \left[ \sum_{k=1}^{N_p} H_k P_{n,k} e^{j2\pi n f_\Delta} (H_k P_{n-1,k} e^{j2\pi (n-1) f_\Delta})^* \right]$$

$$= \angle \left[ e^{-j2\pi f_\Delta} \sum_{k=1}^{N_p} |H_k|^2 |P_{n,k}|^2 \right]$$

whereby the additional estimation noise introduced by the channel estimation $\hat{H}_k$ is avoided. In certain cases, the continuous pilots are a fixed sequence instead of identical. In that case, relation (1) above can be easily modified by using the true value of $P_{n,k}$, $P_{n-1,k}$ (this is true as long as the pilot is positioned in the same position). However, such approaches are simply alternative implementations of the case where pilots are not exactly the same from one OFDM symbol to the other, and suffer a similar performance loss. Conventional phase tracking approaches do not yield reduced phase errors that prevent large bit error rate performance.

BRIEF SUMMARY OF THE INVENTION

The present invention provides a method and system for phase tracking in wireless communication systems. One embodiment involves receiving a first OFDM symbol and a second OFDM symbol which is a repetition of the first symbol, over a wireless channel, the symbols representing an incoming signal. Then a phase of the incoming signal is extracted by performing phase tracking across all subcarrier data tones and pilot tones of the symbols.

Extracting the phase of the incoming signal may further include obtaining a complex conjugate of the first symbol, combining the second symbol with said complex conjugate of the first symbol, and extracting a phase of the incoming signal from said combination. Combining the second symbol with said complex conjugate of the first symbol may further include multiplying the second symbol with said complex conjugate of the first symbol to obtain their product, and extracting a phase of the incoming signal from said combination further includes extracting a phase of the incoming signal from said product.

Phase tracking may further include combining the product over all subcarriers in the symbols, wherein extracting a phase of the incoming signal further includes extracting a phase of the incoming signal from said combination of products. The process may further include receiving multiple repetitions of the first symbol, such that extracting a phase of the incoming signal further includes performing phase tracking across all subcarrier data tones and pilot tones of all said symbols.

These and other features, aspects and advantages of the present invention will become understood with reference to the following description, appended claims and accompanying figures.

DETAILED DESCRIPTION OF THE INVENTION

The present invention provides a method and system for phase tracking in wireless communication systems. One embodiment involves a phase tracking process that compensates for residual phase rotation caused by frequency offset estimation errors in OFDM receivers. The phase tracking process reduces such estimation errors to improve the overall bit-rate performance of the communication system, without adding implementation complexity. The phase tracking process uses non-data aided phase tracking across all subcarrier data and pilot tones, instead of only across the pilot tones. In OFDM, the data tones and the pilot tones occupy different frequency subcarriers. The data tones and pilot tones are provided to different taps of an IFFT and are combined into a time-domain signal.

Figure 1:
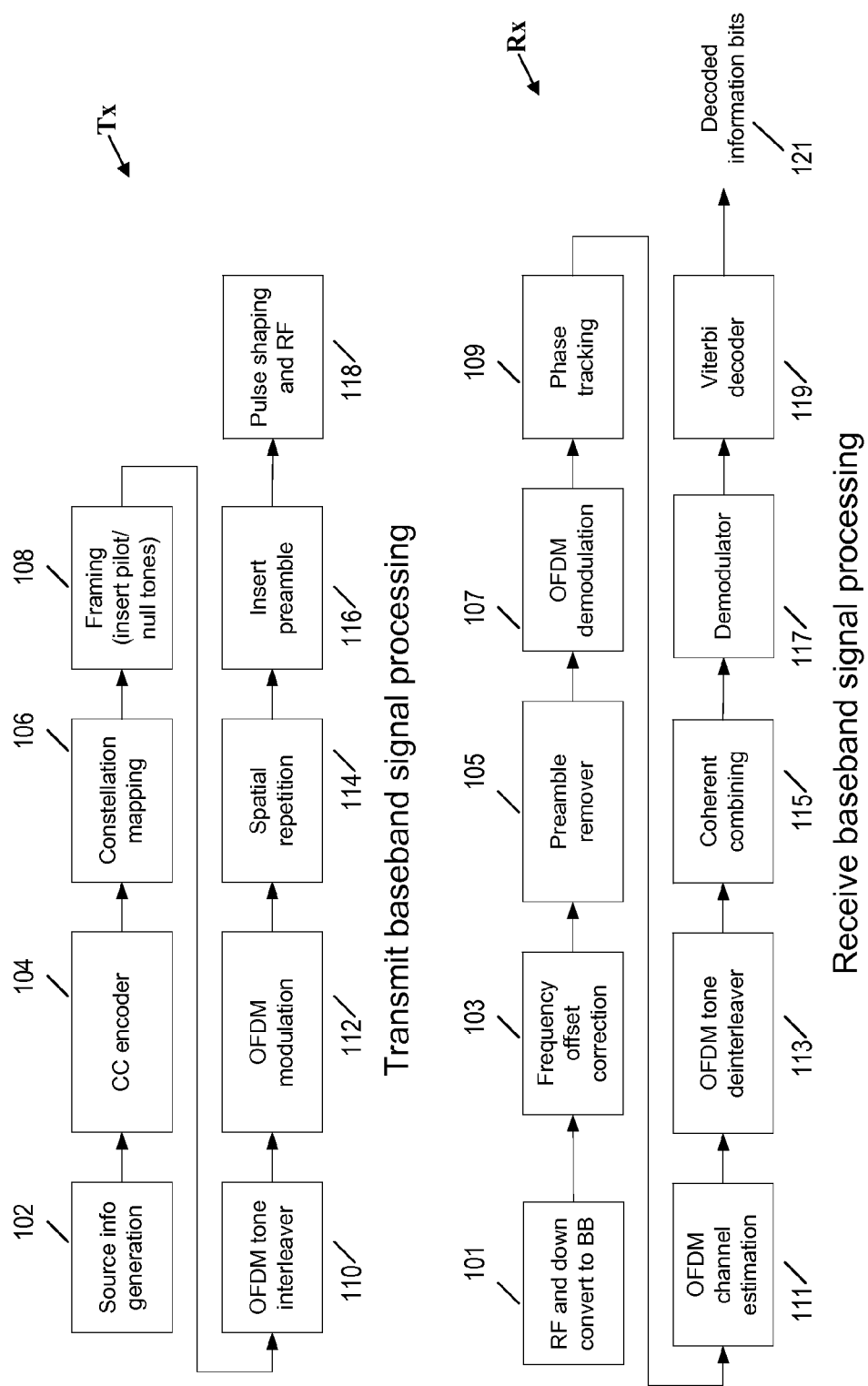
FIG. 1 shows a functional block diagram of a wireless system with adaptive phase tracking at the receiver side, according to an embodiment of the present invention.

FIG. 1 shows a functional block diagram of a wireless communication system 100 implementing a phase tracking process, according to an embodiment of the present invention. Specifically, FIG. 1 shows a transmitter Tx and a receiver Rx, and their respective baseband signal processing sections (chains).

The Tx baseband processing section includes: a source information generator 102 that generates source information signal, a convolutional code (CC) encoder 104 that applies convolutional codes to the source information signal to provide an encoded binary signal, a constellation mapper 106 that maps the encoded binary signal into complex signals, a framer 108 that groups a set of signals (e.g., multiple regular symbols that may make up an OFDM symbol) in a predefined manner, an OFDM tone interleaver 110 that shuffles the symbols in a single OFDM symbol, an OFDM modulator 112 that applies OFDM modulation to the OFDM symbol, a spatial repetition module 114 that performs repetition of the OFDM symbols in the spatial domain (e.g., by using different spatial signatures), a preamble insertion module 116 configured for inserting data payload preamble signals, and a pulse shaping and RF module 118 that amplifies and transmits the signal using electro-magnetic waves over one or more antennas. The Tx transmits one or more repetitions of an OFDM symbol to the Rx for phase tracking.

The Rx baseband processing section includes: an RF and baseband down-converter 101 that converts received electromagnetic waves via multiple antennas, and converts them to baseband digital signals for processing, a frequency offset estimator 103 that provides a coarse estimate of the frequency offset between the transmitter and receiver using the data payload preambles, a preamble remover 105 that removes the preamble data payload preambles, an OFDM demodulator 107 that performs OFDM demodulation, a phase tracking module 109 that implements a phase tracking process, an OFDM channel estimation module 111 that recovers the channel information for symbol detection later, an OFDM tone deinterleaver 113 that performs inverse operation of the transmitter OFDM tone interleaver, a coherent combining module 115 that combines signals from multiple antennas so that maximum SNR is achieved, a demodulator 117 that maps the complex signal into a binary signal (either in hard form or in soft form), a decoder 119 such as a Viterbi decoder then decodes the binary signal (hard/soft) into decoded information bits 121.

A received signal $r_n$ at the receiver Tx during two repeated OFDM symbols can be represented according to relation (2) below as:

$$r_n = \frac{1}{N}\left[\sum_{k=-K}^{K}(X_k H_k + n_k)e^{\frac{j2\pi n(k+f_\Delta)}{N}}\right] \quad (2)$$

wherein $X_k$ is the transmitted data symbols, $H_k$ is the channel frequency response for subcarrier k, K is the total number of subcarriers, $n_k$ is the additive white Gaussian noise, and $f_\Delta$ is the residue frequency offset normalized to the subcarrier spacing. Relation (2) above describes the received signal in time domain.

The DFT for the first received symbol $R_{1,k}$ with the value of the $k^{th}$ subcarrier can be expressed according to relation (3) below as:

$$R_{1,k} = \sum_{n=0}^{N-1} r_n e^{\frac{-j2\pi kn}{N}} \qquad (3)$$

$$k = 0, 1, \ldots, N-1$$

and the DFT for the second received symbol $R_{2,k}$ can be expressed according to relation (4) below as:

$$\begin{aligned} R_{2,k} &= \sum_{n=N}^{2N-1} r_n e^{\frac{-j2\pi kn}{N}} \\ &= \sum_{n=0}^{N-1} r_{n+N} e^{\frac{-j2\pi kn}{N}} \\ &= e^{j2\pi f_\Delta} \sum_{n=0}^{N-1} r_n e^{\frac{-j2\pi kn}{N}} \\ &= e^{j2\pi f_\Delta} R_{1,k} \end{aligned} \qquad (4)$$

Relation (3) above provides the received signal in the frequency domain for the first OFDM symbol, which is obtained after DFT processing at the receiver side. Applying FFT processing to the received signal provides the result in relation (3). This is performed for the first OFDM symbol, as FFT processing is a symbol-based process. Similarly, relation (4) above provides the received signal in the frequency domain for the second OFDM symbol (i.e., an FFT-processed output for the second OFDM symbol). Both relations (3) and (4) are performed by the OFDM demodulator in the receiver side, which provides input to the phase tracking module function of the receiver side.

The number of OFDM symbols may be repeated multiple times (multiple transmissions $N_{rep}$) to increase SNR at the receiver side. A refined phase estimation z can be obtained according to relation (5) below:

$$z = \sum_{n=2}^{N_{rep}} \sum_{k=-K}^{K} R_{n,k} R^*_{(n-1),k} \qquad (5)$$

$$z = e^{j2\pi f_\Delta} \sum_{n=2}^{N_{rep}} \sum_{k=-K}^{K} |R_{n,k}|^2$$

wherein $N_{rep}$ is the number of repetitions in the time domain, implemented by the transmitter side spatial repetition function. As such, the frequency offset at the receiver side can be determined by calculating the phase of z. Relation (5) above describes the cross-correlation between the received signals in the first OFDM symbol and the second OFDM symbol. This correlation is used in estimating the phase offset by the phase tracking function of the receiver side, according to an embodiment of the present invention.

Figure 2:
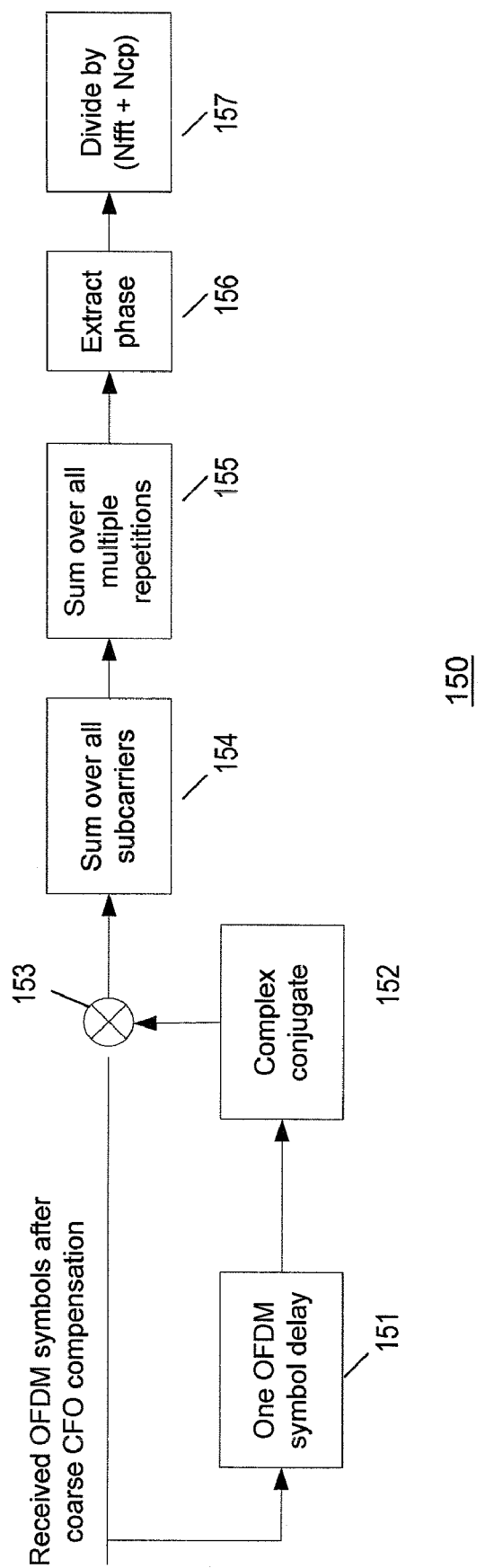
FIG. 2 shows an example flow diagram of a phase tracking process, according to the present invention.

FIG. 2 shows a flow diagram of the steps of a phase tracking process 150 at the receiver side, according to an embodiment of the invention. The process 150 involves repetitions of data symbols for more accurate frequency offset estimation in OFDM receivers, including the steps of:

Step 151: Perform one OFDM symbol delay.

Step 152: Calculate complex conjugate of the delayed symbol while receiving a next OFDM symbol as a current OFDM symbol.

Step 153: Combining the current OFDM symbol with the complex conjugate of the previous OFDM symbol, such as by multiplying the current OFDM symbol with the complex conjugate of the previous OFDM symbol, to obtain their mathematical product.

Step 154: Use data tones and pilot tones to sum the product over all subcarriers in each OFDM symbol. The summed value represents correlation over data subcarriers.

Step 155: Perform the summation over multiple $N_{rep}$ consecutive OFDM symbols, providing a scalar sum value. The scalar sum value represents an averaged correlation data subcarriers.

Step 156: Extract a phase value of the incoming signal from the scalar sum value. For example, let alpha represent the scalar value, which is in general a complex number. As such alpha can be represented as:

alpha=$A$*exp($j$*phi)

where A is the amplitude of alpha and phi is the phase of alpha. Both A and phi are real numbers. Extracting the phase is basically to determine phi given alpha.

Step 157: Divide the phase value by appropriate parameters to obtain an estimate of the frequency offset. In one example, such parameters include Nfft+Ncp, wherein Nfft is an FFT size, and Ncp is a cyclic prefix size. The cyclic prefix size provides the size of a certain guard band used in OFDM modulation. FFT size is the number of subcarriers in total in OFDM modulation. Said appropriate parameters are used for a normalizing constant in estimating the frequency offset. The frequency offset is the value to be estimated. And a good estimator of the frequency offset is given as freq_offset=(phase/normalizing constant), where the normalizing constant is a system dependent scalar and equals to Nfft+Ncp.

The above steps 151-155 realize relation (5) above. In general, at the receiver side, coarse frequency estimation is performed first and then refined frequency estimation (refined phase estimation) is performed. In many cases, both types of estimations are performed to achieve desirable performance.

An implementation of the present invention for mmWave (millimeter-wave) wireless, such as a 60 GHz frequency band wireless system can be useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly.

In WiHD applications, directional low-rate PHY (LRP) implements $N_{rep}$ OFDM symbol repetitive transmissions in order to increase the SNR at the receiver side and increase bit rate performance (an important quantity in high speed, high data rate wireless systems). According to the present invention, non-data aided phase tracking is performed across all data and pilot tones, instead of only across the pilot tones. Non-data aided processing does not require dedicated training symbols/pilots. As such, explicit knowledge of data and pilot values is not required in frequency/phase estimation for phase tracking at the receiver side. An example implementation is provided below.

A frame structure may be used for data transmission between wireless stations. Frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 3:
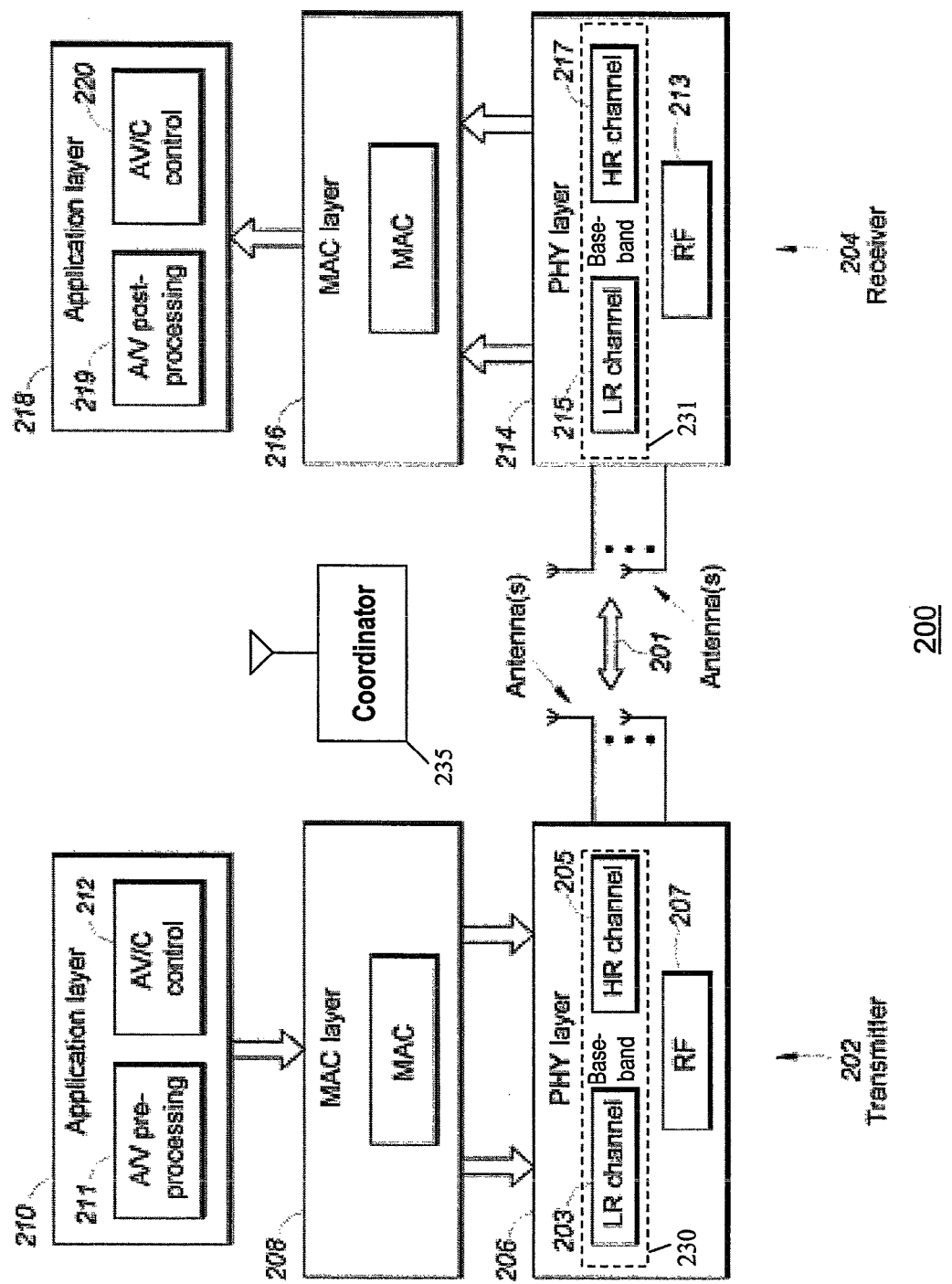
FIG. 3 shows a functional block diagram of a wireless communication system implementing phase tracking, according to an embodiment of the present invention.

FIG. 3 shows a functional block diagram of an example mmWave OFDM wireless communication system 200, such as a WiHD system, for video transmission, implementing said phase tracking process 150 utilizing a frame structure, according to the present invention. The system 200 includes a wireless transmitter (sender) station 202 and wireless receiver station 204, for video transmission (the system 200 may also include a coordinator functional module 235 that facilitates video transmissions, such as in infrastructure mode; the coordinator 235 is a logical module that can be implemented as a stand-alone device or as part of the sender or the receiver).

The sender 202 includes a PHY layer 206, a MAC layer 208 and an application layer 210. The PHY layer 206 includes a radio frequency (RF) communication module 207 which transmits/receives signals under control of a base band process module 230, via a wireless channels 201. The base band module 230 (e.g., Tx in FIG. 1) may include a low-rate channel (LR) communication module 203 for communicating control information, and a high-rate (HR) channel communication module 205 for communication video information.

The application layer 210 includes an audio/visual (A/V) pre-processing module 211 for processing and packetizing video streams, which are then converted to MAC packets by the MAC layer 208. The application layer 210 further includes an AV/C control module 212 which sends stream transmission requests and control commands to reserve channel time blocks for transmission of packets.

The receiver 204 includes a PHY layer 214, a MAC layer 216 and an application layer 218. The PHY layer 214 includes a RF communication module 213 which transmits/receives signals under control of a base band process module 231 (e.g., Rx in FIG. 1). The module 231 may include a LR channel communication module 215 and a HR channel communication module 217. The module 231 implements said phase tracking using data tones and pilot tones, such as process 150 above. The application layer 218 includes an A/V post-processing module 219 for processing and de-packetizing into streams the video information in the MAC packets, received by the MAC layer 216. The application layer 218 further includes an AV/C control module 220 which handles stream control and channel access.

Figure 4:
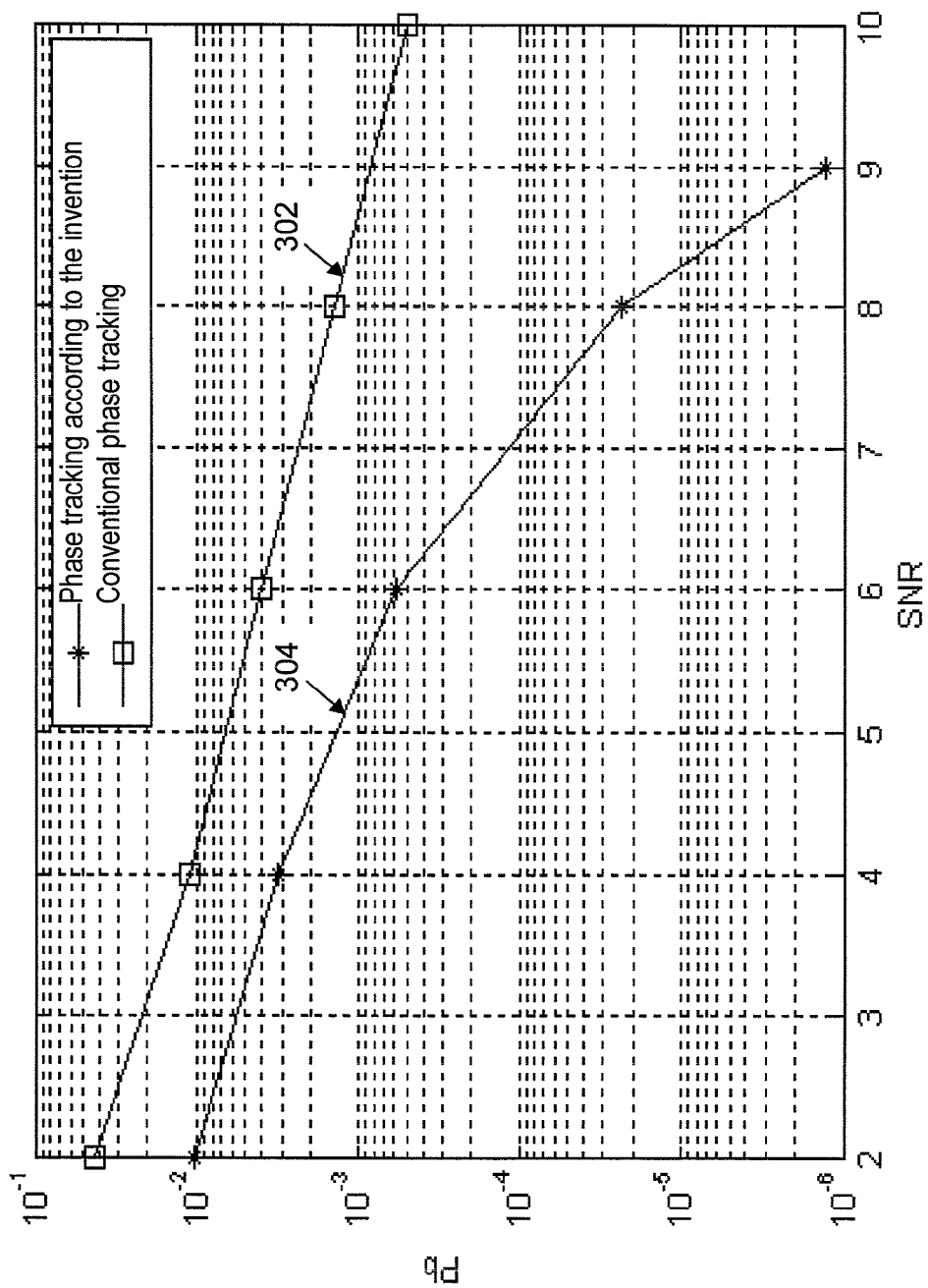
FIG. 4 shows an example performance comparison of a conventional phase tracking process in relation to a phase tracking process, according to an embodiment of the present invention.

FIG. 4 shows a comparison of example simulated results using convention phase tracking 302 by pilot tone tracking, and phase tracking 304 using pilot and data tones, according to the present invention, where a discernable bit error rate performance improvement is observed due to the present invention.

Figure 5:
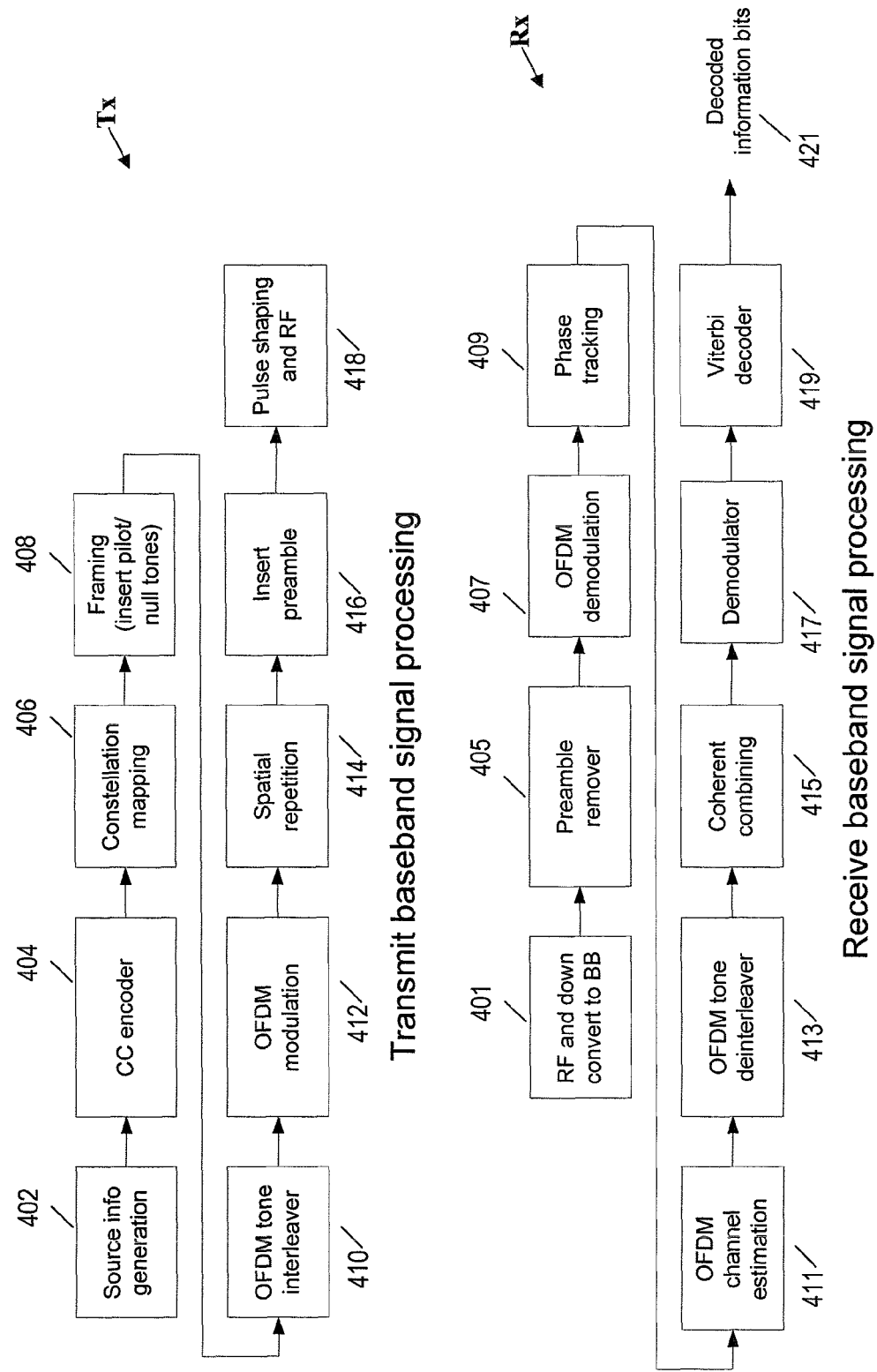
FIG. 5 shows a functional block diagram of another wireless system with adaptive phase tracking at the receiver side, according to an embodiment of the present invention.

Since directional WiHD LRP is used for acknowledgement (ACK) responses which follow exactly 2 microseconds after high-rate PHY (HRP) transmissions, the frequency offset correction in the receiver chain may be skipped, as the transmitter and receiver sides are likely to be coarsely synchronized with each other. In that case, the wireless system 100 in FIG. 1 can be simplified into the wireless system 400 in FIG. 5, wherein the phase tracking process at the receiver side is performed without frequency offset correction. Specifically, in the wireless system 400, a Tx baseband processing section includes: a source information generator 402 that generates source information signal, a CC encoder 404 that applies convolutional codes to the source information signal to provide an encoded binary signal, a constellation mapper 406 that maps the encoded binary signal into complex signals, a framer 408 that groups a set of signals (e.g., multiple regular symbols that may make up an OFDM symbol) in a predefined manner, an OFDM tone interleaver 410 that shuffles the symbols in a single OFDM symbol, an OFDM modulator 412 that applies OFDM modulation to the OFDM symbol, a spatial repetition module 414 that performs repetition of the OFDM symbols in the spatial domain (e.g., by using different spatial signatures), a preamble insertion module 416 configured for inserting data payload preamble signals, and a pulse shaping and RF module 418 that amplifies and transmits the signal using electro-magnetic waves over one or more antennas.

Further, in the wireless system 400 a Rx baseband processing section includes: an RF and baseband down-converter 401 that converts received electro-magnetic waves via multiple antennas, and converts them to baseband digital signals for processing, a preamble remover 405 that removes the preamble data payload preambles, an OFDM demodulator 407 that performs OFDM demodulation, a phase tracking module 409 that implements a phase tracking process, an OFDM channel estimation module 411 that recovers the channel information for symbol detection later, an OFDM tone deinterleaver 413 that performs an inverse operation of the transmitter OFDM tone interleaver, a coherent combining module 415 that combines signals from multiple antennas so that maximum SNR is achieved, a demodulator 417 that maps the complex signal into a binary signal (either in hard form or in soft form), a decoder 419 such as a Viterbi decoder that then decodes the binary signal (hard/soft) into decoded information bits 421.

As such, according to the embodiments of the invention, the phase is extracted from the correlation of the first symbol and the second symbol (product of the first symbol conjugate and the second symbol, summed across subcarriers). The correlation is obtained by computing the correlation over both data and pilot subcarriers (in contrast to the conventional correlation that is obtained by computing the correlation over pilot subcarriers only). Further, in one example, the data symbols are repeated consecutively for $N_{rep}$ times to allow computation of correlation across data subcarriers.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of phase tracking in a wireless communication system, comprising:
   receiving a first Orthogonal Frequency Division Multiplexing (OFDM) symbol having a first spatial signature and a second OFDM symbol which is a repetition of the first symbol based on a second spatial signature that is different from the first spatial signature, over a wireless channel, the symbols representing an incoming signal; and
   extracting a phase of the incoming signal by performing phase tracking across all subcarrier data tones and pilot tones of the symbols.

2. The method of claim 1, wherein extracting a phase of the incoming signal further comprises:
   obtaining a complex conjugate of the first symbol;
   combining the second symbol with said complex conjugate of the first symbol by multiplying the second symbol with said complex conjugate of the first symbol to obtain their component-wise products across all subcarriers; and
   summing the product over all subcarriers in the symbols, wherein extracting a phase of the incoming signal further includes extracting a phase of the incoming signal from said sum.

3. The method of claim 2, wherein extracting a phase of the incoming signal further includes estimating a phase of the incoming signal by determining a ratio of said sum and a combination of cyclic prefix size and Fast Fourier Transform (FFT) size.

4. The method of claim 1, wherein extracting a phase of the incoming signal further includes performing a non-data aided phase tracking across all subcarrier data tones and pilot tones of the symbols.

5. The method of claim 1, wherein extracting a phase of the incoming signal further includes phase tracking at a receiver without frequency offset estimation and correction before preamble removal.

6. The method of claim 5 further including receiving multiple repetitions of the first symbol, such that extracting a phase of the incoming signal further includes performing phase tracking across all subcarrier data tones and pilot tones of all said symbols.

7. The method of claim 6 further including receiving the first symbol based on the first spatial signature and a plurality of repetitions of the first symbol, wherein each repetition having a different spatial signature from one another, such that extracting a phase of the incoming signal further includes performing phase tracking across all subcarrier data tones and pilot tones of all symbols.

8. The method of claim 5, wherein OFDM symbol repetitive transmissions increase the signal-to-noise ratio (SNR) at the receiver and increase bit rate performance.

9. The method of claim 1, wherein a received signal $r_n$ for the first OFDM symbol and the second OFDM symbol is represented such that:

$$r_n = \frac{1}{N}\left[\sum_{k=-K}^{K}(X_k H_k + n_k)e^{\frac{j2\pi n(k+f_\Delta)}{N}}\right]$$

wherein $X_k$ is the transmitted data symbols, $H_k$ is the channel frequency response for subcarrier k, K is the total number of subcarriers, $n_k$ is the additive white Gaussian noise, and $f_\Delta$ is the residue frequency offset normalized to the subcarrier spacing.

10. The method of claim 1, wherein performing phase tracking across all subcarrier data tones and pilot tones of the symbols, comprises performing non-data aided phase tracking across all subcarrier data tones and pilot tones of the symbols.

11. The method of claim 10, wherein dedicated training data tones and pilot tones are not required.

12. A wireless station, comprising:
   a communication module configured for receiving a first Orthogonal Frequency Division Multiplexing (OFDM) symbol based on a first spatial signature and a second OFDM symbol which is a repetition of the first symbol based on a second spatial signature that is different from the first spatial signature, over a wireless channel, the symbols representing an incoming signal; and
   a phase tracking module configured for extracting a phase of the incoming signal by performing phase tracking across all subcarrier data tones and pilot tones of the symbols.

13. The station of claim 12, wherein the phase tracking module is further configured for obtaining a complex conjugate of the first symbol, combining the second symbol with said complex conjugate of the first symbol by multiplying the second symbol with said complex conjugate of the first symbol to obtain their component-wise products across all subcarriers, and extracting a desired phase info from the sum of the said products.

14. The station of claim 13, wherein the phase tracking module is further configured for estimating a phase of the incoming signal by determining a ratio of said sum and a combination of cyclic prefix size and Fast Fourier Transform (FFT) size.

15. The station of claim 12, wherein the phase tracking module is further configured for performing a non-data aided phase tracking across all subcarrier data tones and pilot tones of the symbols.

16. The station of claim 12, wherein the phase tracking module is further configured for extracting a phase of the incoming signal by phase tracking without frequency offset estimation and correction before preamble removal.

17. The station of claim 16, wherein the communication module is further configured for receiving multiple repetitions of the first symbol each based on a different spatial signature from the first spatial signature, and the phase tracking module is further configured for extracting a phase of the incoming signal by performing phase tracking across all subcarrier data tones and pilot tones of all said symbols.

18. The method of claim 17 further including receiving repetitions of the first symbol, such that extracting a phase of the incoming signal further includes performing phase tracking across all subcarrier data tones and pilot tones of all symbols.

19. A wireless communication system, comprising:
   a wireless transmitter configured for transmitting a first Orthogonal Frequency Division Multiplexing (OFDM) symbol based on a first spatial signature and a second OFDM symbol which is a repetition of the first symbol based on a second spatial signature that is different from the first spatial signature, over a wireless channel, the symbols representing an incoming signal; and
   a wireless receiver comprising:
      a communication module configured for receiving the first OFDM symbol and the second OFDM symbol; and
      a phase tracking module configured for extracting a phase of the incoming signal by performing phase tracking across all subcarrier data tones and pilot tones of the symbols.

20. The system of claim 19, wherein the phase tracking module is further configured for combining the second symbol with said complex conjugate of the first symbol by multiplying the second symbol with said complex conjugate of the first symbol to obtain their component-wise products across all subcarriers, and then extracting a desired phase info from the sum of the said products.

21. The system of claim 19, wherein the communication system comprises a millimeter-wave communication system, and the communication module is further configured for receiving multiple repetitions of the first symbol, wherein each repetition having a different spatial signature from one another, and the phase tracking module is further configured for extracting a phase of the incoming signal by performing phase tracking across all subcarrier data tones and pilot tones of all said symbols.

* * * * *